United States Patent

[11] 3,593,067

[72] Inventor John B. Flynn
Belmont, Mass.
[21] Appl. No. 658,725
[22] Filed Aug. 7, 1967
[45] Patented July 13, 1971
[73] Assignee Honeywell Inc.
Minneapolis, Minn.

[54] SEMICONDUCTOR RADIATION SENSOR
1 Claim, 4 Drawing Figs.

[52] U.S. Cl. .......... 317/234 R, 317/235 AK, 317/235 N
[51] Int. Cl. .......... H01l 15/00
[50] Field of Search .......... 317/235, 21, 9, 47, 234

[56] References Cited
UNITED STATES PATENTS

| | | | |
|---|---|---|---|
| 3,335,341 | 8/1967 | Lin | 317/235 |
| 3,366,802 | 1/1968 | Hilbiber | 307/251 |
| 3,370,995 | 2/1968 | Lowery et al. | 148/175 |
| 3,388,255 | 6/1968 | May | 250/209 |
| 2,969,497 | 1/1961 | Kiyasu et al. | 321/69 |
| 3,076,104 | 1/1963 | Miller | 307/88.5 |
| 3,117,229 | 1/1964 | Friedland | 250/83.3 |
| 3,389,264 | 6/1968 | Briggs et al. | 250/211 |
| 3,351,493 | 11/1967 | Weiman | 136/89 |

*Primary Examiner*—John W. Huckert
*Assistant Examiner*—Martin H. Edlow
*Attorneys*—Roger W. Jensen, Charles J. Ungemach, George W. Field and Robert E. Walrath

ABSTRACT: An integrated diode array for use as a radiation sensor is shown. The individual diodes are isolated by grooves formed on one side of the array and by biasing the array so that the charge depletion layer of the PN junction extends beyond the grooves.

INVENTOR.
JOHN B. FLYNN
BY Geo W Field
ATTORNEY

INVENTOR.
JOHN B. FLYNN
BY
ATTORNEY

SEMICONDUCTOR RADIATION SENSOR

SUMMARY OF THE INVENTION

This invention pertains to integrated diode structure for use as a radiation sensor. Radiation sensors consisting of individual diodes are well known in the art. Such detectors depend on the phenomenon of hole-electron pair generation by incident radiation. A general description of the photoeffect in semiconductors is given in A. van der Ziel, *Solid State Physical Electronics*, Prentice-Hall, Chapter 17.

Prior art attempts to fabricate diode arrays for use as radiation detectors generally encountered practical difficulties due to the difficulty of isolating the diodes from one another and to the obscuring of active sensing area by contacts, and to the fact that the PN junction must be very close to the surface of the semiconductor material. Incident radiation is absorbed by a semiconductor in accordance with the equation $I=I_0e^{1ax}$ where $I$ represents the photon intensity at a distance $x$ below the incident surface, $I_0$ represents the photon intensity just under the surface, and $a$ represents the absorption coefficient. As the equation indicates, most of the absorption of radiation takes place close to the surface on which it is incident. The hole-electron pairs or free charge carriers generated by incident photons of radiation are separated at the PN junction giving rise to the photocurrent. A photocurrent generated in bulk semiconductor materials has negligible external effect because the free charge carriers recombine rapidly. However, hole-electron pairs created near a PN junction are separated by the potential gradient across the PN junction so that they cannot recombine. Generally, charge carriers generated within a diffusion length of the charge depletion layer or space charge region are separated by the junction potential to become part of the photocurrent. From this brief discussion, it is evident that the PN junction should be close to the surface on which radiation is incident so that the maximum number of hole-electron pairs generated by the incident radiation add to the photocurrent thereby increasing the sensitivity of PN junction sensor or detector.

This invention comprises an array of detectors or sensors such that the relative position of radiation incident on the detector can be determined when the cross-sectional area of the incident radiation is small compared to the area of the sensor array. The invention can thus be used in such applications as star tracking where the position of the incident radiation relative to the sensor is important. The sensor elements must be isolated from each other so that each element collects only that photocurrent generated at a particular position on the array. Ordinarily, an array is formed by scribing or etching grooves into the semiconductor material to form islands or regions. Etching is preferred because mechanical scribing causes ragged and irregular grooves. If the PN junction is placed on the islands formed by the grooves, problems are encountered in making contact to the islands because the contacts and conductors block out a substantial portion of the radiation thereby decreasing the sensitivity of the device. Alternatively, the PN junction can be formed on the side opposite the islands, but due to the practical consideration of mechanical strength, the PN junction then has to be formed too deep in the semiconductor material, so that the sensitivity of the device would again be decreased. Another alternative is that the grooves can be made deep enough so that they penetrate into the charge depletion layer, but this alternative weakens the array so that it is easily broken. Furthermore, it is difficult to make grooves very deep because the etchant attacks the sides of the grooves and makes the islands small.

In this invention a PN junction is formed near one surface of a wafer of semiconductor material and grooves are etched into the other surface to form an array of sensor elements. Then a bias is applied between the two surfaces such that the charge depletion layer of the PN junction is widened so that it extends or penetrates into the islands or sensor elements. In this manner the islands or sensor elements formed by the grooves are effectively isolated from each other because there are no free charge carriers in the charge depletion layer so that the resistance between sensor elements is extremely high.

Accordingly, it is an object of this invention to provide a new and novel radiation detector or sensor array.

It is a further object of this invention to provide a semiconductor radiation detector or sensor array wherein the several sensor elements are outlined by grooves and are isolated from each other by biasing the semiconductor array to widen the charge depletion layer of a PN junction whereby the charge depletion layer penetrates into the sensor elements.

These and other objects and advantages of this invention will become evident to those skilled in the art upon a reading of this specification and the appended claims in conjunction with the drawings, of which:

FIGURE 1

Figure 1:
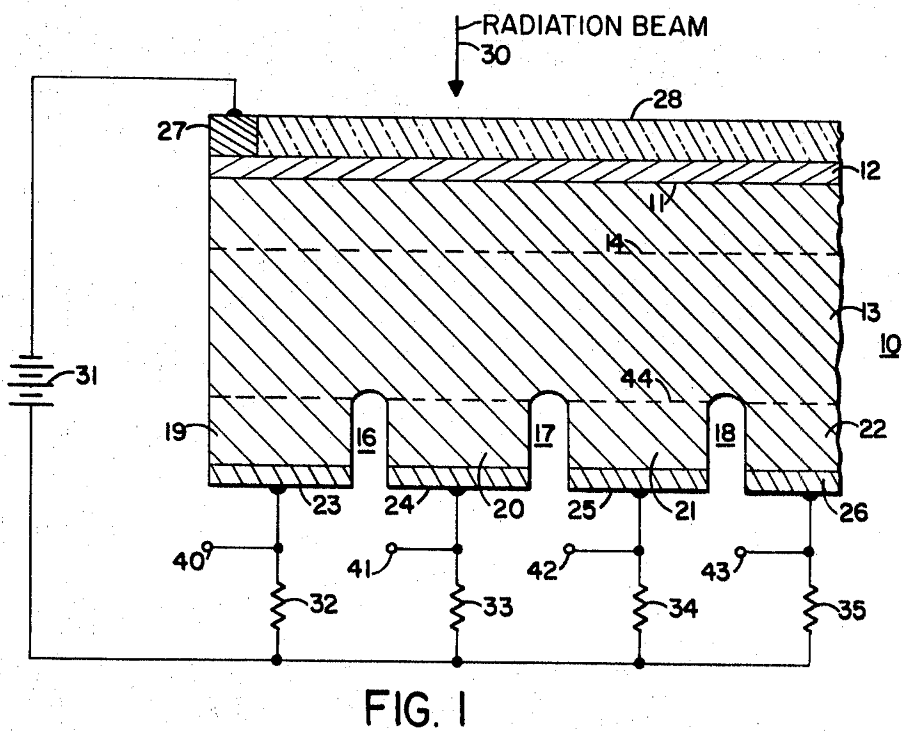
FIG. 1 is a cross section of a portion of an integrated radiation sensor or detector array.

In FIG. 1 there is shown a unitary block, wafer, or chip 10 of semiconductor material. A PN junction generally defined by line 11 is formed near one surface of wafer 10. For the remainder of this specification it will be assumed that the starting material or substrate is a wafer of N-type silicon and that junction 11 is formed by diffusing boron impurities into the wafer to form P region 12 and N region 13. However, it evident that other semiconductor materials could be used and that the starting material could be a different conductivity type semiconductor material. The PN junction has a charge depletion layer or space charge region associated with it. All of the free charge carriers (electrons and holes) are swept from the charge depletion layer by the electric field or potential barrier of the junction. In wafer 10 the lower limit of the charge depletion layer is represented by dashed line 14, when wafer 10 is not biased. The extent of the charge depletion layer depends strongly on the impurity concentration of the semiconductor material and on the bias voltage applied. As an example, assume that the impurity concentration in the N region 13 is $1.5\times10^{12}$ impurity atoms per cm.$^3$. The charge depletion layer will then be about 0.001—0.0001 inch thick. If a 20 volt reverse bias is applied across the junction, the charge depletion layer will be on the order of 0.005 inch thick. It should be noted that P region 12 will ordinarily be much more heavily doped than the N region 13.

Grooves or channels 16, 17, and 18 are etched into wafer 10 on a side opposite from junction 11. Grooves 16—18 form a plurality of sensor elements, islands, areas, or regions 19—22. Metallic contacts 23—26 are placed on regions 19—22, respectively, so that electrical contacts can be made to each of the regions. An electrical contact 27 is placed on the opposite surface of wafer 10 so that a bias can be applied between contacts 23—26 and contact 27. Contact 27 can be made quite small and can be placed in a position where it does not block incident radiation. A layer of protective material 28 may also be placed on wafer 10. Layer 28 can be any suitable transparent material such as $SiO_2$; but the material must be transparent to the radiation of interest.

The incident radiation is represented by arrow 30. The radiation penetrates into the semiconductor material where it is absorbed to generate hole-electron pairs. The hole-electron pairs generated in the charge depletion layer or within a diffusion length of the charge depletion layer become free charge carriers and add to or become a part of the photocurrent. This photocurrent is collected by regions 19—22 and can be measured from signals taken at contacts 23—26.

In most applications for a device of this nature the purpose of the array is to ascertain the position of radiation beam 30 relative to the sensor array. However, if the charge depletion layer only extends to line 14, the free charge carriers migrate through N region 13 and are not necessarily collected by the one of regions 19—22 which is directly beneath radiation beam 30. Thus, it is necessary to isolate regions 19—22 from each other. As was mentioned above, grooves 16—18 could be extended further into N region 13 until they extend pass line 14. However, extending grooves 16—18 would seriously weaken the structure. Furthermore, when grooves 16—18 are extended by etching, the etchant also attacks the sides of the grooves so that regions 19—22 become quite small relative to the size of the grooves; in other words, the active area of the sensor array becomes smaller thereby decreasing the sensitivity.

To isolate regions 19—22 from each other a biasing source or battery 31 is connected between contacts 27 and 23—26. The negative terminal of source 31 is connected to contact 27. The positive terminal of source 31 is connected by a resistor 32 to contact 23, by a resistor 33 to contact 24, by a resistor 34 to contact 25, and by a resistor 35 to contact 26. The bias provided by source 31 widens the depletion region to line 44. Line 44 lies slightly deeper in N region 13 then the ends of grooves 16—18 so that the charge depletion layer penetrates into regions 19—22. Since there are no free charge carriers in the depletion layer, regions 19—22 are effectively isolated from each other because current cannot flow from one region to any other region. Furthermore, biasing wafer 10 makes the charge depletion layer wider so that more photons of incident radiation 30 are absorbed in the charge depletion layer and accordingly the photocurrent is greater. Hole-electron pairs generated in the charge depletion layer are subject to an electric field or potential barrier which causes the electrons to move toward regions 19—22 and the holes to move toward P region 12. The electrons migrate generally toward the nearest one of regions 19—22 since the electric field associated with junction 14 is generally in a vertical direction in FIG. 1.

Output terminals 40—43 are connected to electrical contacts 23—26, respectively. The photocurrent generated by incident radiation provides output signals (excess or greater currents) at terminals 40—43 which can be measured to determine which of regions 19—22 is receiving a photocurrent due to incident radiation 30.

FIGURES 2—4

Figure 2:
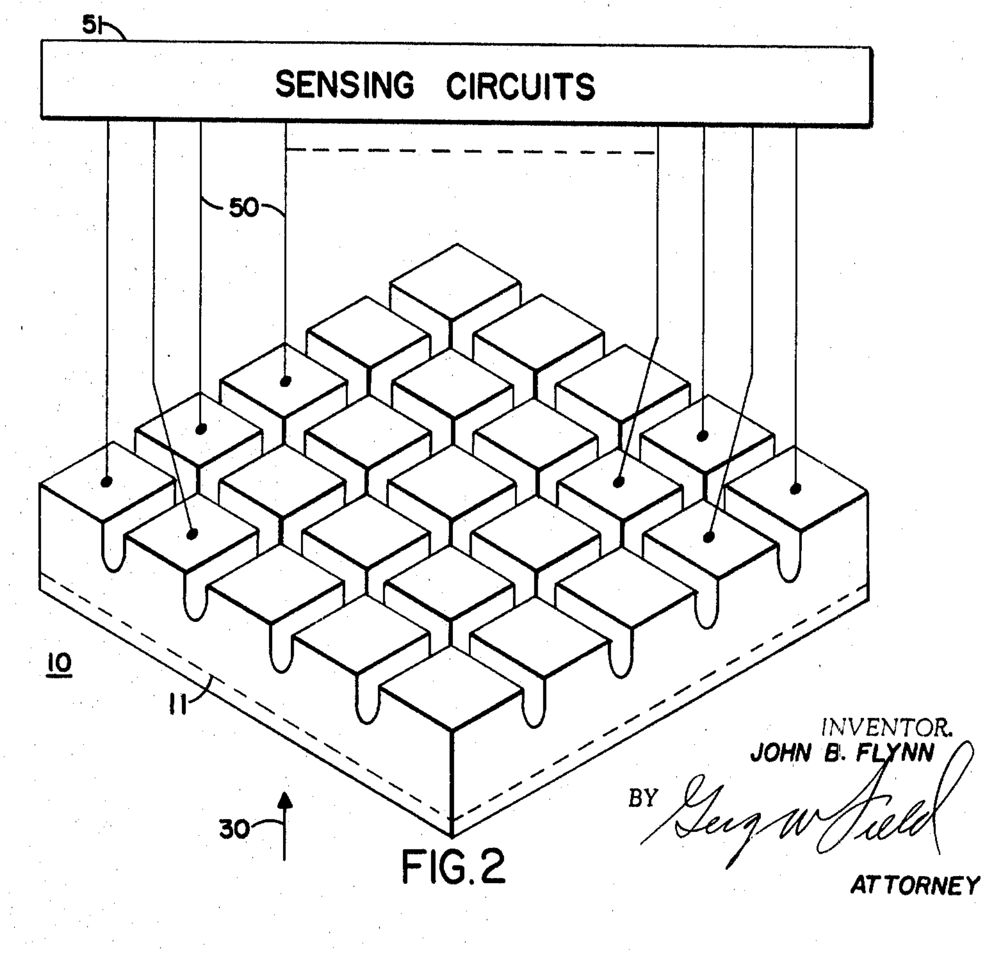
FIG. 2 is an isometric drawing of a sensor or detector array.

In FIG. 2 wafer 10 is shown as a 5 by 5 array of a sensor elements. The PN junction is represented by a dashed line 11. It should be noted that some of the dimensions of the structure have been exaggerated for clarity. The biasing circuitry is not shown in FIG. 2 for clarity.

Output signals taken from each of the regions of wafer 10 are coupled by a set of conductors, of which conductors 50 are representative, to sensing circuits 51. Not all of the conductors 50 are shown. Note that radiation 30 is incident on a surface of wafer 10 which is not shown in FIG. 2.

Figure 3:
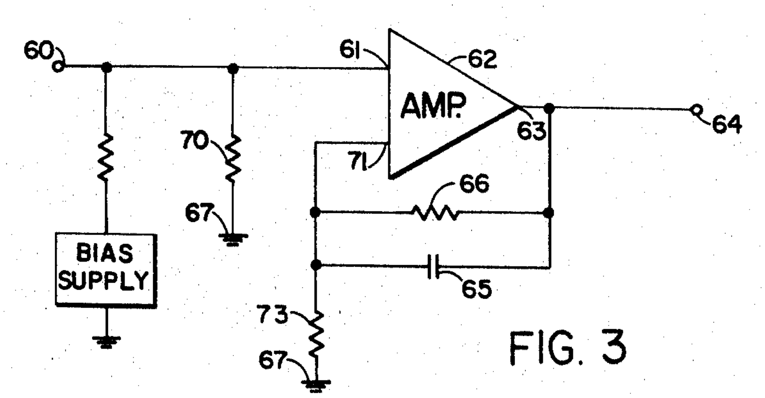
FIG. 3 is a schematic drawing of a circuit for sensing output signals from the array.

FIG. 3 shows a circuit for sensing the output signals. An input terminal 60 is connected to a first input 61 of an amplifier 62 which has an output 63 connected to an output terminal 64. Output 63 is further connected to a second input terminal 71 of amplifier 62 by a parallel combination of a capacitor 65 and a resistor 66. Input terminal 60 is further connected to a common conductor or ground 67 by means of a resistor 70. Input terminal 71 is further connected to ground 67 by means of a resistor 73. Terminal 60 is connected to one of the output conductors 50 of FIG. 2. Each output conductor 50 is connected to a circuit similar to the circuit shown in FIG. 3. The bias supply cancels the bias from source 31.

Capacitor 65 and resistors 66 and 73 provide feedback around amplifier 62. The bias supply cancels the bias signal so that the bias signals due to source 31 are removed or cancelled from the input signal by amplifier 62. The feedback can be adjusted by adjusting the values of the feedback capacitor and resistors so that amplifier 62 will provide suitable amplification. One amplifier which can be used for amplifier 60 is a Motorola integrated amplifier model MC1531. Other amplifiers could also be used and other sensing circuits could be used in place of the circuit shown in FIG. 3. The incident radiation can also be modulated by chopping it so that AC signals are provided at the outputs of the sensor elements.

Figure 4:
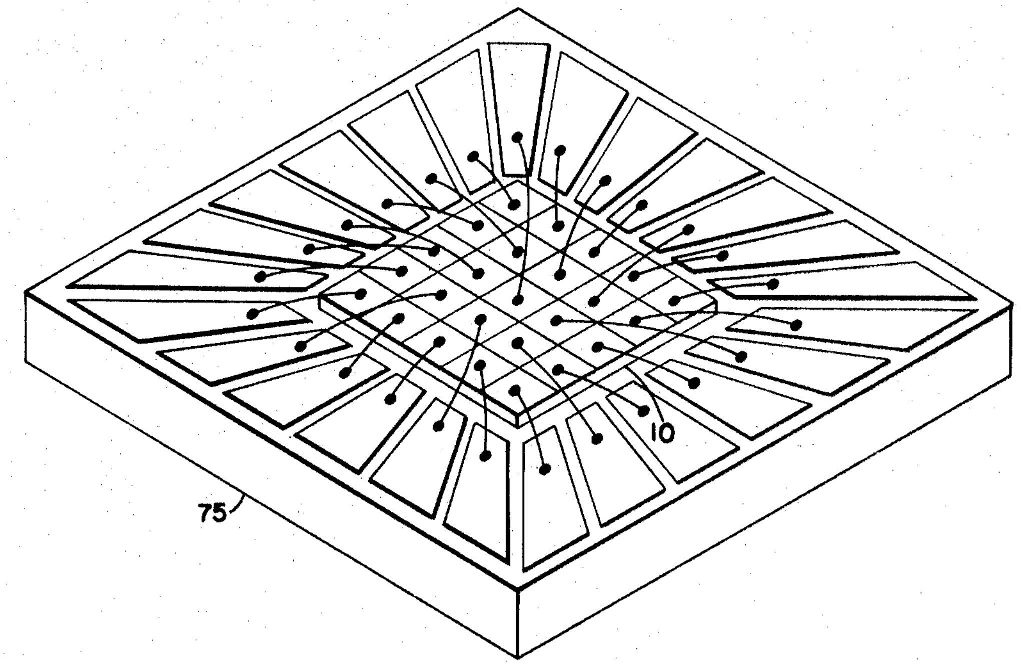
FIG. 4 is an isometric drawing of a sensor or detector array mounted on a circuit board or header.

FIG. 4 shows a mechanical design of wafer 10 and a circuit board or header 75. Wafer 10 is placed in an aperture in circuit board 75. Radiation is incident on wafer 10 from the under side of the structure of FIG. 4. A set of contacts are arranged around the periphery of circuit board 75 and leads are connected between these contacts and the various regions or sensor elements of wafer 10. Further connections are made between the contacts on the periphery of circuit board 75 and the sensing circuits 51. Circuit board 75 may be constructed of any suitable material. An additional contact equivalent to contact 27 of FIG. 1 is made to the side of wafer 10 and circuit board 75 which is not shown.

While I have illustrated and described various specific embodiments of my invention, it will be evident to those skilled in the art that various modifications of my invention can be made. For example, the particular examples of dimensions were given for illustrative purposes only and are not to be considered limiting. Accordingly, I do not wish to be limited by the specific embodiments shown and described but only by the scope of the appended claims.

I claim as my invention:

1. A photodiode comprising, in combination:

a wafer (10) of semiconductor material having a first, thin region of a first conductivity type (12) and a second, thicker region of opposite conductivity type (13) forming a N junction and an intrinsic junction depletion region therebetween;

a plurality of intersecting grooves penetrating into one surface of said wafer to a depth insufficient to reach said intrinsic depletion layer, so as to divide said one surface into a plurality of adjacent, separated mesa areas;

first conducting means making electrical connection to all of said mesa areas independently;

second conducting means making electrical connection to the other surface of said wafer; and reverse biasing means connected to said first and second conducting means and of magnitude sufficient to broaden said depletion layer until it passes the bottoms of said grooves, whereby to mutually isolate said areas electrically.

UNITED STATES PATENT OFFICE
CERTIFICATE OF CORRECTION

Patent No. 3,593,067 Dated July 13, 1971

Inventor(s) John B. Flynn

It is certified that error appears in the above-identified patent and that said Letters Patent are hereby corrected as shown below:

Claim 1, line 5, delete "N" and substitute

--PN--.

Signed and sealed this 11th day of January 1972.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334